United States Patent
Zoppas et al.

(10) Patent No.: US 11,794,391 B2
(45) Date of Patent: Oct. 24, 2023

(54) INJECTION APPARATUS FOR PLASTIC PREFORMS

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Matteo Zoppas, Conegliano (IT); Andrea Cavalet, Ponte Nelle Alpi (IT); Paolo Spinazze', San Vendemiano (IT); Andrea Martegani, Conegliano (IT); Giorgio Dam, Caneva (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 272 days.

(21) Appl. No.: 17/286,572

(22) PCT Filed: Oct. 23, 2019

(86) PCT No.: PCT/IB2019/059060
§ 371 (c)(1),
(2) Date: Apr. 19, 2021

(87) PCT Pub. No.: WO2020/084515
PCT Pub. Date: Apr. 30, 2020

(65) Prior Publication Data
US 2021/0339441 A1 Nov. 4, 2021

(30) Foreign Application Priority Data

Oct. 23, 2018 (IT) .................. 102018000009710

(51) Int. Cl.
*B29C 45/17* (2006.01)
*B29C 45/14* (2006.01)
(Continued)

(52) U.S. Cl.
CPC .......... *B29C 45/1753* (2013.01); *B29C 45/14* (2013.01); *B29C 45/281* (2013.01); *B29L 2031/7158* (2013.01)

(58) Field of Classification Search
CPC .......................... B29C 45/1753; B29C 45/281
See application file for complete search history.

(56) References Cited

U.S. PATENT DOCUMENTS

| 4,173,448 A | 11/1979 | Rees et al. |
| 6,214,275 B1 | 4/2001 | Catoen et al. |

(Continued)

FOREIGN PATENT DOCUMENTS

| FR | 2837738 A1 | 10/2003 |
| WO | 2007017428 A1 | 2/2007 |

OTHER PUBLICATIONS

International Search Report & Written Opinion received for the International Application No. PCT/IB2019/059060, dated Feb. 12, 2020, 15 pages.

*Primary Examiner* — James Sanders
(74) *Attorney, Agent, or Firm* — AMSTER ROTHSTEIN & EBENSTEIN LLP (57) ABSTRACT

An injection apparatus for injecting molten plastic into a mold of articles made of thermoplastic material including bottle preforms. The injection apparatus includes an injection nozzle and a shutter for controlling flow of the molten plastic through the injection nozzle. A cylinder-piston system moves the shutter from open and closed positions of the injection nozzle. The cylinder-piston system includes a first chamber with a first passage for introducing fluid into the (Continued)

first chamber to open the shutter, and a second passage, different from the first passage, for discharge of fluid and of possible particles from the first chamber. A fluid distribution device with a first channel is connected to the first passage, and a second channel different from the first channel is connected to the second passage. The cylinder-piston system includes a second chamber having a third passage for introducing fluid into the second chamber to close the shutter.

17 Claims, 7 Drawing Sheets

(51) Int. Cl.
  *B29C 45/28* (2006.01)
  *B29L 31/00* (2006.01)

(56) References Cited

U.S. PATENT DOCUMENTS

2009/0159828 A1† 6/2009 Esser
2011/0241238 A1† 10/2011 Trakas

† cited by third party

Fig. 2

INJECTION APPARATUS FOR PLASTIC PREFORMS

CROSS-REFERENCES TO RELATED APPLICATIONS

This application claims benefit under 35 U.S.C. § 371 to international application No. PCT/IB2019/059060 filed on Oct. 23, 2019, which claims priority to Italian application No. 102018000009710 filed Oct. 23, 2018, the contents of which are incorporated by reference in their entireties.

FIELD OF THE INVENTION

The present invention relates to the sector of molding of products made of thermoplastic material, e.g. such as preforms of containers made of thermoplastic material, e.g. PET bottle preforms.

In particular, the present invention relates to the injection apparatus of such products, with particular reference to the cleaning of the injection apparatus actuating devices.

BACKGROUND OF THE INVENTION

Bottle preforms made of thermoplastic materials are typically produced by means of an injection molding or injection-compression molding process.

In such processes, a given amount of molten thermoplastic material is injected into a mold, which imparts the shape of the preform.

Typically, an injection molding or injection-compression molding apparatus comprises a molten material distribution device, known as a manifold or hot chamber in the sector, provided with a system of channels (hot-runners) with which the molten material is distributed in each mold by passing through a nozzle.

A shutter (valve stem) is provided to control the dose of molten material to be injected into each mold. The nozzle from which the molten material exits is opened and closed according to the position of the shutter.

The shutter can indeed slide from a closing position to an opening position of the nozzle. A cylinder-piston system is provided for controlling the sliding of the shutter, the piston of which is constrained to the shutter.

The cylinder-piston system is of the dual-acting type. In particular, there are two chambers which, suitably pressurized with compressed air, allow the movement of the piston.

In particular, the lower chamber, i.e. distal from the mold, is pressurized to take the shutter into the closing position, and the upper chamber, i.e. proximal to the mold, is pressurized to take the shutter into the opening position.

Only one opening is provided for each of the two chambers for pressurization and depressurization.

The opening of the upper chamber and the opening of the lower chamber are connected to an air distribution device, which is known as an air plate in the sector. When the lower chamber is pressurized, air is introduced into the lower chamber opening and exits through the upper chamber opening. On the other hand, when the upper chamber is pressurized, the air is introduced into the upper chamber opening and exits through the lower chamber opening.

Disadvantageously, during the operation of the apparatus, there is a passage, in particular a leakage, of particles of molten plastic material towards the upper chamber, where the material solidifies and accumulates.

As a result, the piston stroke is slowed down or stopped, possibly preceded by a slowing down or general malfunction of the apparatus.

Therefore, it is necessary to carry out periodic maintenance of the cylinder-piston system, which involves dismantling, the use of labor, and long downtimes of the apparatus.

The main cause of leakage of the particles is that the shutter slides inside a guide, and that there is necessarily a small clearance between the two components, which allows the passage of plastic particles into the upper chamber.

Indeed, since the plastic material is substantially molten, it can also pass through a very small gap, such as the gap between the guide and the shutter. However, once solidified, the plastic remains trapped in the upper chamber.

Despite the attempt to minimize the clearance between the shutter and the guide, there must still be a gap between the two components to allow the sliding of the shutter but which does not guarantee a perfect seal, so the disadvantageous leakage of particles, which involves the above complications, occurs.

SUMMARY OF THE INVENTION

It is an object of the present invention to provide an injection apparatus, wherein the upper chamber of the cylinder-piston system can be easily cleaned of unwanted plastic material.

In particular, the present invention aims at achieving an effective removal of solidified plastic material from the upper chamber, without having to dismantle the cylinder-piston system.

It is one of the objects of the invention to allow the removal of plastic particles from a chamber of the cylinder-piston system, particularly from the chamber proximal to the mold, without needing to stop the production of articles and preventing the ejected plastic particles from being returned to the chamber.

The present invention achieves at least one of such objects, and other objects which will be apparent in light of the present description, by means of an injection apparatus for injecting molten plastic into a mold of articles made of thermoplastic material, comprising at least one shutter, defining a longitudinal axis, for opening or closing an injection nozzle; at least one cylinder-piston system adapted to move said at least one shutter from an opening position of the injection nozzle to a closing position of said injection nozzle and vice versa; wherein the at least one cylinder-piston system comprises a first chamber provided with a first passage for the introduction of fluid into the first chamber to take the shutter to the opening position; and a second passage, different from the first passage for the exit of fluid and possible plastic particles from the first chamber, preferably wherein there is provided a fluid distribution device provided with a first channel connected to said first passage, and with a second channel, different from the first channel and connected to said second passage. In particular, the first channel and the second channel, being distinct, i.e. separate, from each other can be crossed by two different fluid flows, e.g. two different air flows.

The invention further comprises a method for removing plastic particles, in particular solid particles, from the first chamber of an injection apparatus according to any of the preceding claims from 1 to 10, comprising, at least a step in which fluid and possible plastic particles are made to exit from the first chamber through said second passage, preferably during the movement of the shutter from the opening position to the closing position.

Preferably, in all embodiments, there is provided a guiding body of the shutter provided with a through hole crossed by the shutter and communicating with the inside of the first chamber. In particular, an annular gap communicating with the inside of the first chamber is provided between the guiding body and the shutter. Preferably, the difference between the inner diameter of the through hole and the outer diameter of the shutter, in particular of its sliding part in the guiding body, is between 2 and 25 µm.

Since the shutter is restrained to the piston, a movement of the shutter towards the closing position corresponds to a stroke of the piston towards the mold, and a movement of the shutter towards the opening position corresponds to a stroke of the piston away from the mold.

Preferably, when the piston is in an end stroke position distal from the mold, the shutter is in the opening position, and when the piston is in another end stroke position distal from the mold, the shutter is in the closing position.

Advantageously, according to an aspect, the invention allows the removal of plastic particles at each injection cycle into the mold, without having to block the movement of the shutter. In particular, particles can be removed during the piston stroke in the direction of the mold, i.e. during the movement of the shutter from the opening position to the closing position.

Advantageously, since the fluid distribution system comprises a first channel and second channel, which are mutually distinct, each connected to a respective passage of the first chamber, it is possible to avoid the re-introduction of plastic particles into the first chamber. In particular, it prevents plastic particles from being introduced into the first channel, into which air is introduced to move the shutter from the closing to the opening position.

Indeed, it is possible, for example, to provide means which, in a first configuration, are adapted to prevent the exit of fluid and possible plastic particles from the first passage (or, in other words, to prevent the introduction of fluid and plastic particles into the first channel), and to allow the exit of fluid and possible plastic particles from the second passage (or, in other words, to allow the introduction of fluid and plastic particles into the second channel), during the movement of the at least one shutter from the opening position to the closing position. In particular, plastic particles can only exit from the second passage, and only enter into the second channel.

Instead, during the movement of the at least one shutter from the closing to the opening position, said means, in a second configuration, are adapted to prevent the exit of fluid from the second passage (or, in other words, to prevent the flow of fluid into the second channel), and to allow the introduction of fluid in the first passage, through the first channel.

Said means can pass from the first configuration to second configuration and vice versa.

Said means may, for example, comprise or consist of at least one valve, e.g. a valve preferably a three-way valve, in particular a three-way, two-position valve. Alternatively, a system of valves can be provided, for example.

Advantageously, the means, e.g. said at least one valve, can be integrated into the fluid distribution system, or air plate.

The injection apparatus preferably comprises also a second chamber provided with a third passage for the introduction of fluid into the second chamber to take the shutter to the closing position Furthermore, the fluid distribution device is preferably provided with a third channel, distinct from the first channel and the second channel, connected to said third passage. Preferably, said means, in the first configuration, are adapted to allow the introduction of fluid into the second chamber, in particular by keeping the third channel open; and in the second configuration said means are adapted to allow the exit of fluid from the third passage, in particular by keeping the third channel open.

According to another aspect, the particles can be removed during piston travel in the direction away from the mold and/or when the piston is at the end of the travel in a distal position from the mold.

Advantageously, according to an aspect, the invention allows the removal of plastic particles by means of a specific operation, which can be carried out easily, and in any case without dismounting the cylinder-piston system, after a predetermined number of injection cycles and/or after a predetermined time, e.g. every 10000 injection cycles and/or every two hours.

Advantageously, in particular by virtue of the presence of the two openings of the second chamber, it is possible to introduce a flow of air which goes from the first opening to the second opening for a predetermined time, e.g. for a time between 0.1 seconds and 10 minutes. Such an airflow allows the removal of plastic particles from the second chamber.

Further features and advantages of the present invention will become more apparent in light of detailed description of preferred, but not exclusive embodiments.

The dependent claims describe particular embodiments of the invention.

BRIEF DESCRIPTION OF THE FIGURES

The description of the invention refers to the accompanying drawings, which are provided by way of non-limiting example, in which.

The same elements or components have the same reference numerals.

DESCRIPTION OF EXAMPLE EMBODIMENTS OF THE INVENTION

An injection apparatus or molding apparatus according to the invention is used for making articles, e.g. preforms, made of thermoplastic material, e.g. made of PET. The preforms are bottle preforms, for example.

In particular, the injection apparatus is used to inject molten plastic through an injection nozzle 31 (FIG. 1E) into a preform mold (not shown) in an injection molding or injection-compression molding process.

In all embodiments, an injection apparatus according to the invention comprises: at least one shutter 3, defining a longitudinal axis, for opening or closing the injection nozzle;

at least one cylinder-piston system 104, 204, 304 adapted to move said at least one shutter 3 from an opening position of the injection nozzle 31 to a closing position of the injection nozzle 31, and vice versa;

wherein the at least one cylinder-piston system 104, 204, 304 comprises a first chamber 142, 242, 342 provided with a first passage 144, 244, 344 for the introduction of fluid into the first chamber 142, 242, 342 to take the shutter 3 to the opening position;

and a second passage 149, 249, 349, distinct from the first passage 144, 244, 344 for the exit of fluid and possible plastic particles from the first chamber 142, 242, 342.

Figures 1A, 1B:
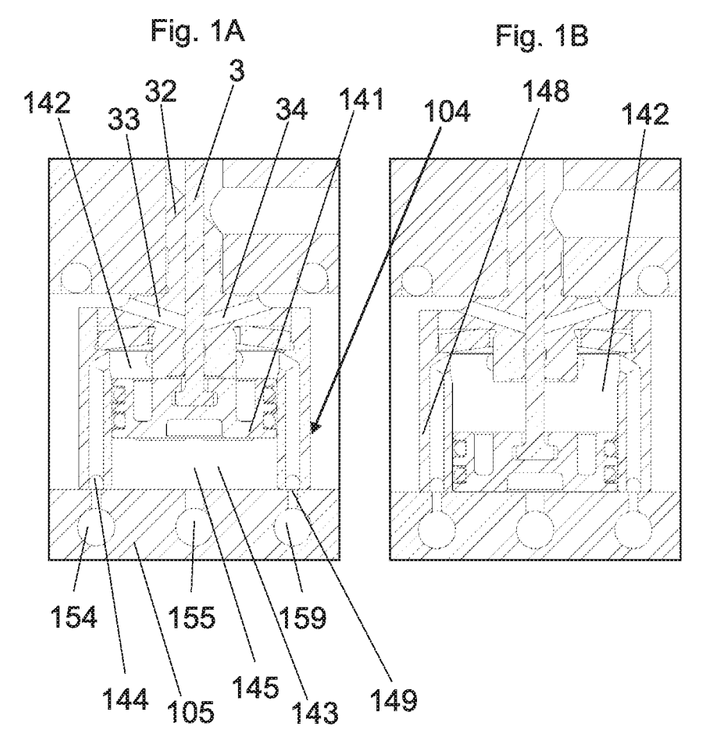
FIGS. 1A to 1D are section views of part of an injection molding apparatus of a first example of the invention, during different steps of the molding cycle.
Figure 1C:
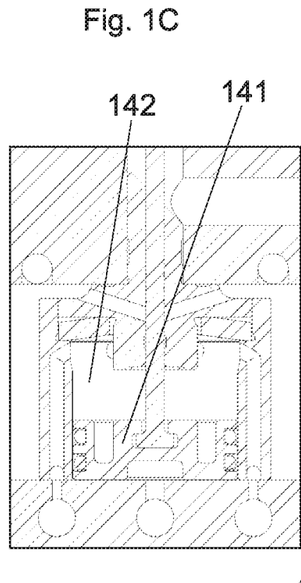
Figure 1D:
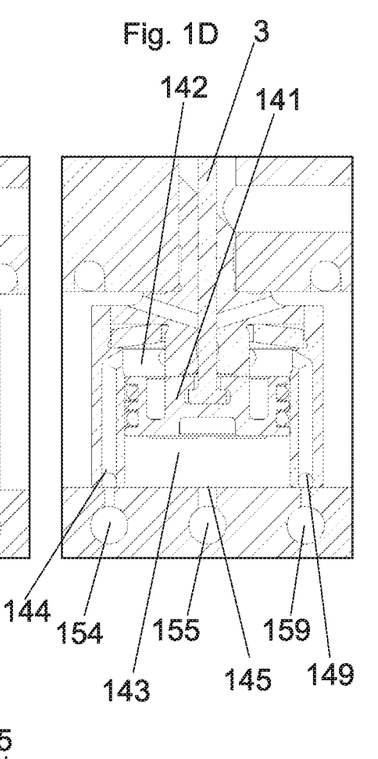
Figure 1E:
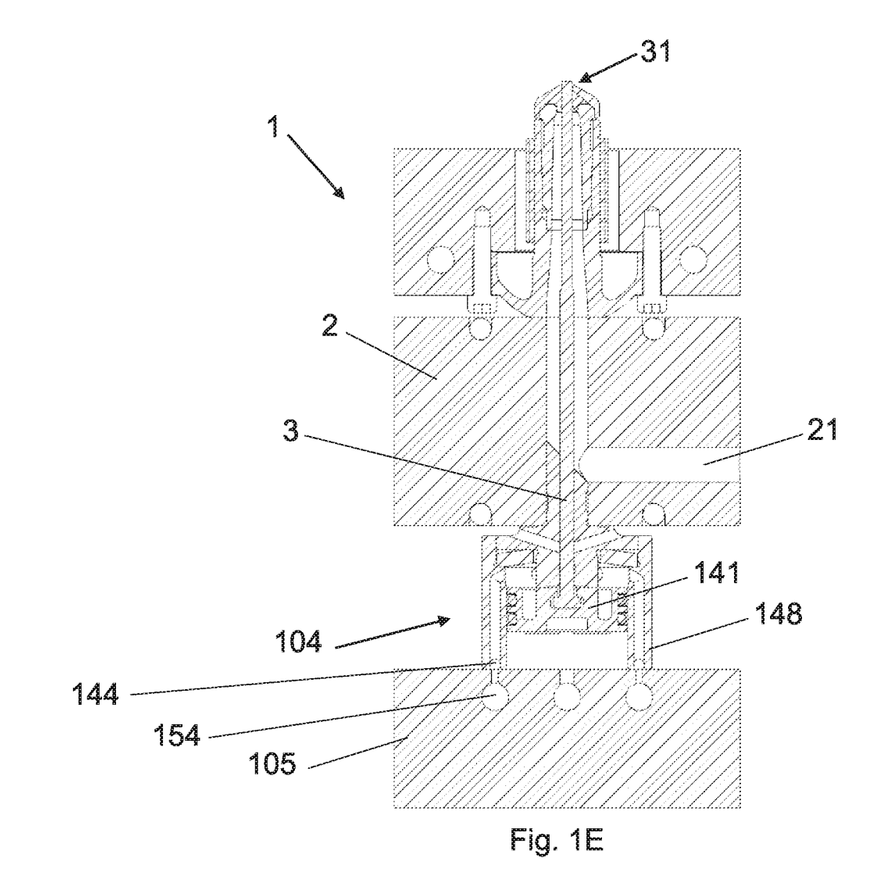
FIG. 1E is a section view of part of an apparatus according to the first example, of which details are shown in FIGS. 1A and 1D.

With particular reference to FIG. 1E, an injection molding or injection-compression molding apparatus 1, according to the invention, comprises a molten material distribution device 2, known as a manifold or hot chamber in the sector, provided with a system of channels (hot-runner) with which the molten material is distributed in each mold. FIG. 1E partially shows a channel 21 which communicates with a mold via the injection nozzle 31, also named simply nozzle.

The shutter 3 (valve stem) is used to control the dose of molten material to be injected into each mold. The nozzle 31 from which the melted material exits is opened and closed according to the position of the shutter 3. In FIG. 1E, the shutter 3 is in the closing position.

The shutter 3 is constrained to the piston 141, 241, 341 of the cylinder-piston system 104, 204, 304.

Preferably, the shutter 3 is inserted into a through hole of a guiding body 32, as further described below. The shutter 3, moved by piston 104, 204, 304, is adapted to slide with respect to guiding body 32.

A movement of the shutter 3 towards the closing position corresponds to a stroke of the piston 141, 241, 341 towards the mold, and a movement of the shutter 3 towards the opening position corresponds to a stroke of the piston 141, 241, 341 away from the mold.

Preferably, when the piston 141, 241, 341 is in an end stroke position distal from the mold, the shutter is in the opening position, and when the piston is in another end stroke position proximal to the mold, the shutter 3 is in the closing position.

The cylinder-piston system 104, 204, 304 is preferably dual-acting.

In the examples shown, the cylinder-piston system 104, 204, 304 is of the pneumatic type, and the fluid which is introduced into the first chamber 142, 242, 342 is air. However, the cylinder-piston system 104, 204, 304 may also be of a different type from the pneumatic or exclusively pneumatic type. By way of non-limiting example, the movement of the piston to take the shutter into the opening position may be controlled by pneumatic means, while the movement of the piston to take the shutter to the closing position may be performed by mechanical means.

Preferably, the apparatus comprises a plurality of cylinder-piston systems 104, 204, 304, and there is a respective shutter 3 for each system.

Preferably, the cylinder 148, 248, 348 of the cylinder-piston system 104, 204, 304 is closed underneath by the air distribution device 105, 205, 305, on which piston 141, 241, 341 can abut when it reaches the end stroke position distal from the mold.

Preferably, the cylinder 148, 248, 348 is closed at the top by the guiding body 32. Preferably, the piston 141, 241, 341 can abut on the guiding body 32 when it reaches the end stroke position proximal to the mold.

In the examples shown, a fluid, in particular air, distribution device 105, 205, 305, is provided connected to the cylinder-piston system 104, 204, 304.

In the examples shown, the cylinder-piston system 104, 204, 304 comprises two chambers, also named first chamber 142, 242, 342 and second chamber 143, 243, 343 for descriptive purposes, or with reference to the figures, upper chamber and lower chamber, respectively.

The first chamber 142, 242, 342 and the second chamber 143, 243, 343 are separated from each other at least partially by the piston 141, 241, 341.

The second chamber 143, 243, 343 is adapted to be pressurized, e.g., by means of air, to bring the piston 141, 241, 341 to the end stroke position proximal to the mold. For the introduction of air, the second chamber 143, 243, 343 is provided with an opening 145, 245, 345 (or passage), which communicates with a channel 155, 255, 355 of the air distribution device 105, 205, 305, from which an air flow comes. The opening 145, 245, 345 is also used for the exit of air from the chamber 143, 243, 343. Optionally, the opening 145, 245, 345 is substantially aligned, particularly coaxial, with the shutter 3. The first chamber 142, 242, 342 is adapted to be pressurized, e.g. by means of air, to take the piston 141, 241, 341 to the position distal from the mold.

The first chamber 142, 242, 342 of the cylinder-piston system 104, 204, 304 is provided with the first passage 144, 244, 344, which is or comprises an opening, or hole, connected to the air distribution device 105, 205, 305 for the introduction of air into the chamber 142, 242, 342.

In particular, the first passage 144, 244, 344 is connected to a channel 154, 254, 354 of the air distribution device 105, 205, 305, so as to be able to receive an air flow coming from the channel 154, 254, 354, in particular which exits from an orifice of the channel 154, 254, 354. When more than one piston-cylinder system is provided, the air distribution device is provided with a channel 154, 254, 354 for each of such piston cylinder systems. The channels 154, 254, 354, 155, 255, 355 are typically part of the system or circuit of channels of the air distribution device 105, 205, 305.

Advantageously, the first chamber 142, 242, 342 further comprises the second passage 149, 249, 349, distinct from the first passage 144, 244, 344. The second passage 149, 249, 349 is used for the exit of air from the chamber 142, 242, 342.

Preferably, the second passage 149, 249, 349 has a section, in particular an air passage section, having an area of at least 0.2 mm².

In particular, the second passage 149, 249, 349 preferably has a section with an area comprised from 1 mm² to 5 mm².

With particular reference to FIGS. 1A, 1B, 1C, 1D, 1E and 2, in a first embodiment, the second passage 149, which is or comprises an opening, is connected, in particular directly connected, to an air channel 159, distinct from the channel 154, of the air distribution device 105. Therefore, the air in the chamber 142 can exit from the opening 149 to enter into the channel 159.

Advantageously, since the air and possible plastic particles exit from the second passage 149 and are introduced into the channel 159, the plastic particles are not reintroduced into chamber 142. Indeed, during the movement of the piston from the opening to the closing position, the channel 154 is kept closed, preventing the fluid and plastic particles from entering into channel 154, while channel 159 is kept open. Preferably, the channel 159 communicates with an environment outside the apparatus or with a collection container for the plastic.

Preferably, the first passage 144 and the second passage 149 are obtained in mutually opposite portions of the cylinder wall 148, preferably in opposite portions of the bottom wall of the cylinder 148 with respect to the longitudinal axis of shutter 3. Preferably, the opening 145 of the second chamber 143 is arranged between the first passage 144 and the second passage 149 of the first chamber 142.

Preferably, the injection apparatus comprises means, e.g. a valve 5 (diagrammatically shown in FIGS. 1F and 1G) adapted to control the opening and closing of channel 154 and channel 159. In particular, the valve 5 can allow the passage of air towards chamber 142 through the passage 144, and prevent such a passage as a function of the operating step of the apparatus. In particular, the valve 5 can prevent air and plastic particles from exiting from passage 144 towards channel 154, e.g. by closing channel 154.

Furthermore, the valve 5 can allow the passage of air from the chamber 142 towards the outside of the chamber 142, and prevent such a passage as a function of the operating step of the apparatus.

Figure 1F:
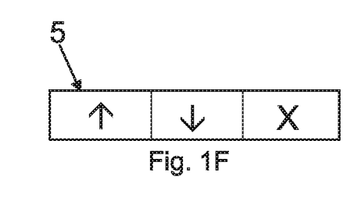
FIG. 1F diagrammatically shows a configuration of a component of an apparatus of the invention.

FIG. 1F diagrammatically shows a configuration of the valve 5 in which channel 154 is open, channel 155 is open, and channel 159 is closed. In particular, to take the shutter 3 from the closing position to the opening position, the valve 5 allows a passage of air from the channel 154 to the passage 144, in particular a one-way flow; allows a passage of air from the passage 145 to the channel 155, in particular a one-way passage; and prevents a passage of air from the passage 149 to the channel 159.

Figure 1G:
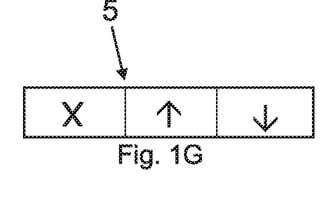
FIG. 1G diagrammatically shows another configuration of a component of an apparatus of the invention.

FIG. 1G diagrammatically shows another configuration of the valve 5 in which channel 154 is closed, channel 155 is open, and channel 159 is open. In particular, to take the shutter 3 from the opening position to the closing position, the valve 5 allows a passage of air from the channel 155 to the passage 145, in particular a one-way flow; allows a passage of air and possible plastic particles from the passage 149 to the channel 159, in particular a one-way passage; and prevents a passage of air and possible plastic particles from the passage 144 to the channel 154.

Such a valve 5 is preferably an electro-mechanical valve, and is preferably integrated in the air distribution device 105.

Preferably, the channel 154 is connected, i.e. it is in fluid communication, only with the passage 144, and therefore does not communicate with the passage 149.

Preferably, the channel 159 is connected, i.e. it is in fluid communication, only with the passage 149, and therefore does not communicate with the passage 144.

When a plurality of cylinder-piston systems is provided, channel 154 can be connected, for example, to all passages 144; and similarly channel 159 can be connected, for example, to all passages 149.

Preferably, there is provided a guiding body 32 of the shutter 3 provided with a through hole crossed by the shutter 3 and communicating with the inside of the chamber 142. In particular, an annular gap is provided between the guiding body 32 and the shutter 3. The second passage 149 is distinct from said gap. Preferably, the difference between the inner diameter of the through hole and the outer diameter of the shutter 3, in particular of its part slidable in the guiding body 32, is between 2 and 25 µm.

Preferably, the guiding body 32 comprises at least two discharge channels 33, 34, e.g. four, of which each discharge channel 33, 34 communicates, on one side, with the environment outside the injection apparatus and, on the other side, with said through hole of the guiding body 32. Preferably, the discharge channels 33, 34 are transverse to the longitudinal axis of the shutter 3.

Advantageously, the injection apparatus according to this embodiment allows the execution of a method to remove plastic particles, in particular solid particles, from the chamber 142, comprising a step in which fluid, e.g. air, and possible plastic particles are made to exit from the chamber 142, through the second passage 149.

For example, said step can be performed during the movement of the shutter 3 from the opening position to the closing position, i.e. during the stroke of the piston 141 towards the mold.

In particular, the method comprises the step of:
a1) introducing air into chamber 143 through the channel 155 and the opening 145, or passage, of the chamber 143, keeping channel 154 closed and channel 159 open, so that the piston 141 moves towards the mold, thus causing the air and plastic particles to exit from chamber 142 through the second passage 149 and the channel 159. Advantageously, since the channel 154 is closed, the plastic particles are prevented from entering into the channel 154.

Advantageously, this step can be performed at each injection cycle.

By way of example, an injection or molding cycle comprises the following steps:
when the piston 141 is in the end stroke position proximal to the mold (FIG. 1A, closing position), introducing air into chamber 142, in particular through the channel 154 and the first passage 144, keeping the channel 159 closed, so as to pressurize the chamber 142;
continuing to introduce air into the chamber 142, keeping the channel 159 closed, so that piston 141 moves to the position proximal to the mold until the piston 141 reaches the end stroke (FIG. 1B, opening position);
when the piston 141 is in the end stroke position proximal to the mold (closing position), closing the channel 154 and opening channel 159 (FIG. 1C);
performing the aforesaid step a1), FIG. 1D.

These four steps can be repeated for the next molding operation.

Figure 2:
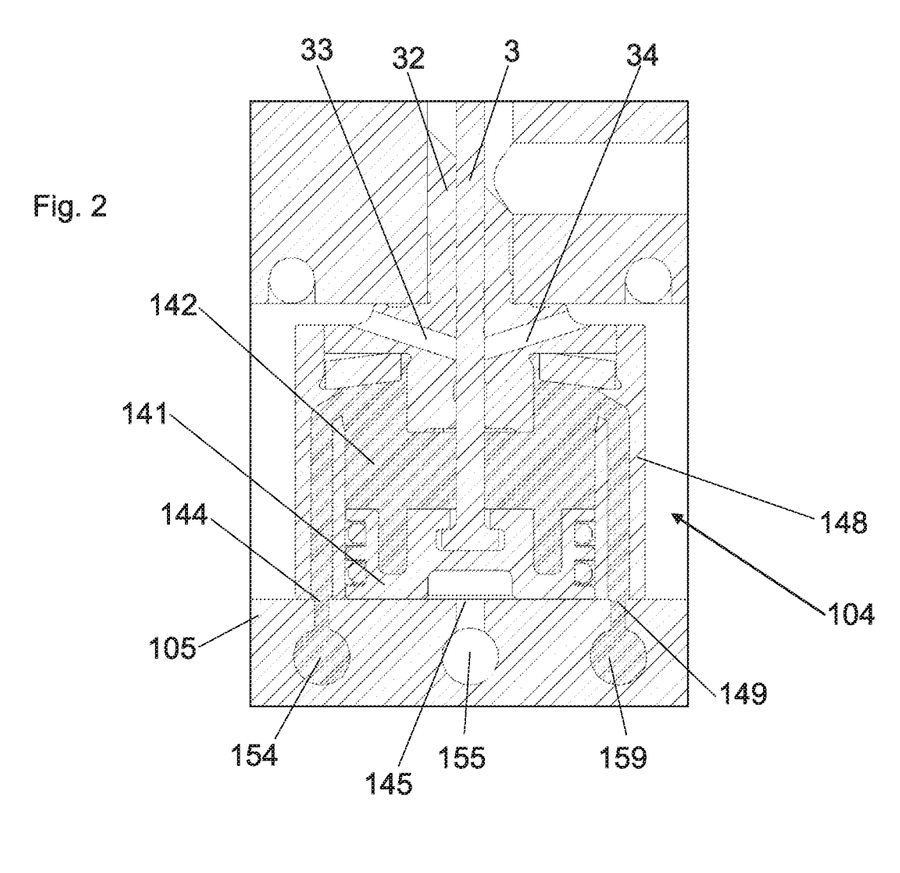
FIG. 2 is a diagrammatic section view of the injection apparatus in FIG. 1E during a step of cleaning of the upper chamber.

Advantageously, in this embodiment, the injection apparatus also allows a method to be performed to remove plastic particles, particularly solid particles, from the second chamber 142, wherein when the piston 141 is in the end stroke position distal from the mold, air exits from the second passage 149, so that the plastic particles present in the chamber 142 exit from the chamber 142 through the second passage 149 and the channel 159 (FIG. 2).

In particular, the method comprises the step of:
a2) injecting air into the chamber 142 through the channel 154 and the first passage 144, keeping the second channel 159 open, thus causing air and plastic particles to exit from the chamber 142 through the second passage 149 and the second channel 159, step a2) being performed when the piston 141 is in the aforesaid end stroke position distal from the mold (nozzle in the opening position).

Advantageously, this step (a2) can be performed after a predetermined number of injection cycles and/or after a predetermined time, e.g. every 10000 injection cycles and/or every two hours.

Preferably, step a2) lasts between 0.1 seconds and 10 minutes.

With particular reference to FIGS. 3A, 3B, 3C, 3D, particularly in a second embodiment, the second passage 249, or opening, is obtained in a side wall 281 of cylinder 248 of the cylinder-piston system 204. Such a side wall 281 guides the piston 241 as it travels towards the mold or away from the mold. Also in the first embodiment, the second passage can be obtained in the side wall.

Preferably, the first passage 244 and the second passage 249 of chamber 242 are at the sides of cylinder 248 opposite with respect to the longitudinal axis of shutter 3.

Preferably, the injection apparatus is configured so that when the shutter 3 is in the opening position of the injection nozzle, the second passage 249 communicates with an inner volume of the first chamber 242; while, when the shutter 3 is in the closing position of the injection nozzle, the second passage 249 is closed by the piston 241.

In particular, preferably, the injection system is configured so that during all or at least part of the stroke of the piston 241 towards the end stroke position distal from the mold, the second passage 249 is completely or partially obstructed by the piston 241. Preferably, the injection apparatus is further configured so that when the piston 241 is in the end stroke position distal from mold, the second passage 249 is free, in particular completely free, from the piston 241.

Preferably, but not exclusively, the second passage 249 comprises an inner first part 282 having a first section, and an outer second part 283, which flows into the outside of the cylinder 248, which is adjacent to the first part 282, and which has a second section.

The second section is preferably larger than the first section, in order to have a better control of the exit of the air from the chamber 242.

Preferably, the second section is about 10 to 25 times larger than the first section.

Preferably, there is a part delimited by a tapered wall towards the first part 282, e.g. a truncated cone wall, between the first part 282 and the second part 283.

Preferably, there is provided a guiding body 32 of the shutter 3 provided with a through hole crossed by the shutter 3 and communicating with the inside of the chamber 242. In particular, an annular gap is provided between guiding body 32 and shutter 3. The second passage 249 is distinct from said gap. Preferably, the difference between the inner diameter of the through hole and the outer diameter of the shutter 3, in particular of its part slidable in the guiding body 32, is between 2 and 25 μm.

Preferably, the guiding body 32 comprises at least two discharge channels 33, 34, e.g. four, of which each discharge channel 33, 34 communicates, on one side, with the environment outside the injection apparatus and, on the other side, with said through hole of the guiding body 32. Preferably, the discharge channels 33, 34 are transverse to the longitudinal axis of the shutter 3.

Figure 3A:
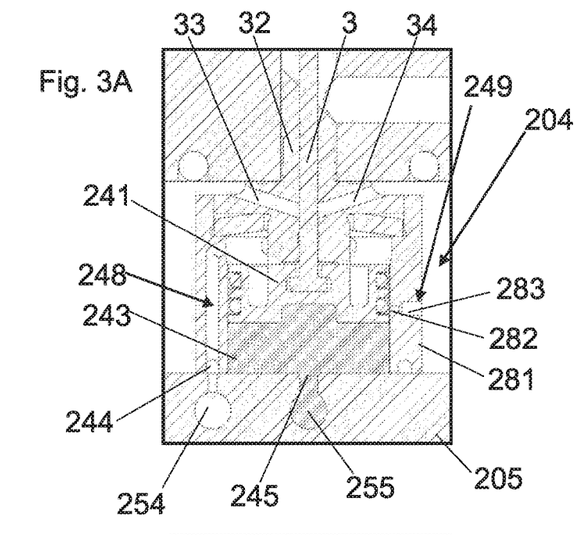
FIGS. 3A to 3D are section views of part of an injection molding apparatus of a second example of the invention, during different steps of the molding cycle.
Figure 3B:
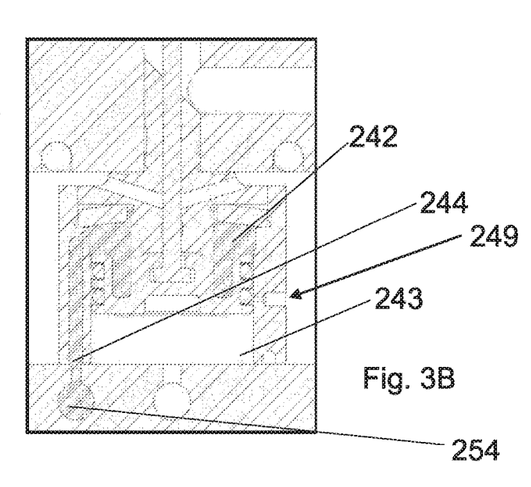
Figure 3C:
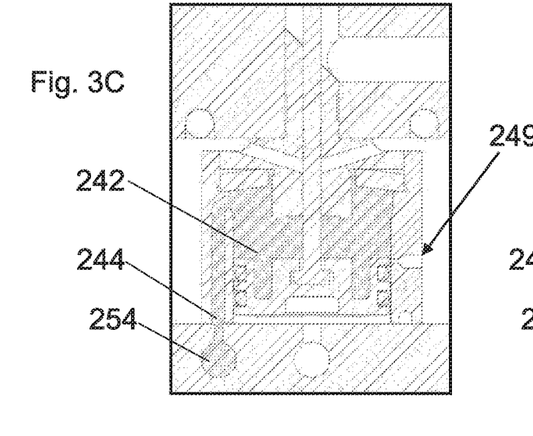
Figure 3D:
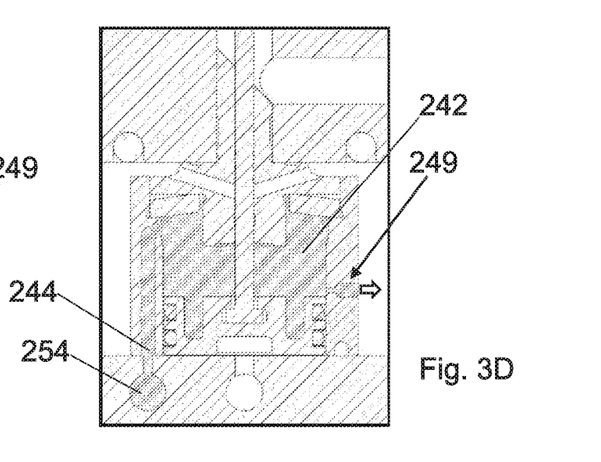
Figure 4A:
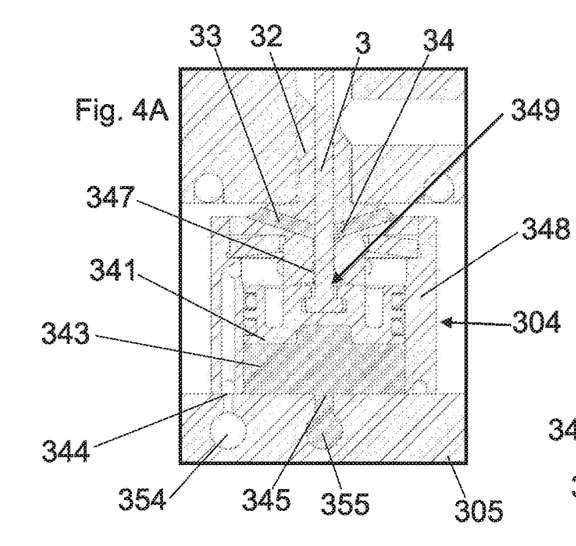
FIGS. 4A to 4D are section views of part of an injection molding apparatus of a third example of the invention, during different steps of the molding cycle.
Figure 4B:
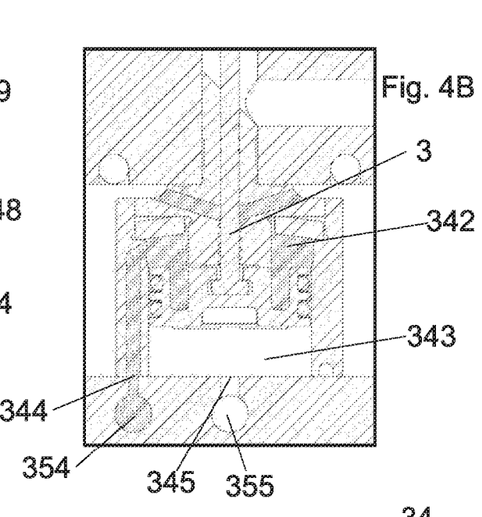
Figure 4C:
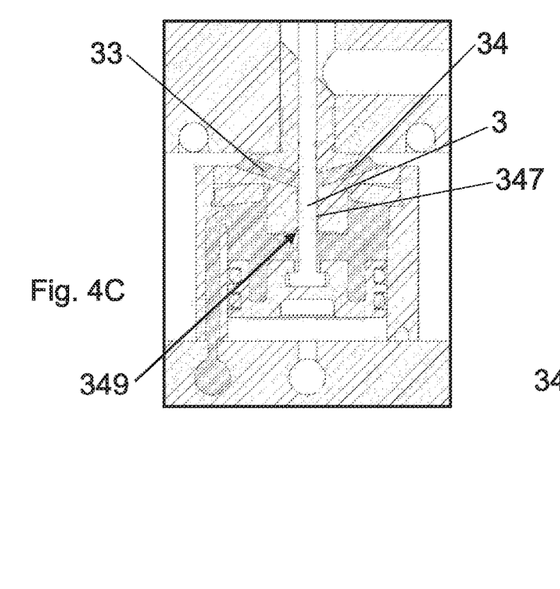
Figure 4D:
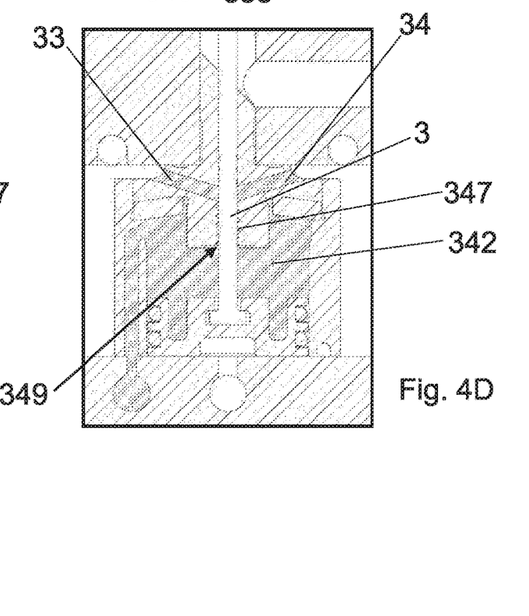

Advantageously, in this embodiment, the injection apparatus allows a method to be performed for removing plastic particles, in particular solid particles, from the second chamber 242, in which when the piston 241 is in the end stroke position distal from the mold (shutter 3 in opening position), air and possible plastic particles are made to exit from the chamber 242 through the second passage 249 (FIG. 3D).

In particular, the method comprises the step of:

a) injecting air into the chamber 242, in particular through the channel 254 and the first passage 244, thus causing air and plastic particles to exit from the chamber 242 through the second passage 249, step a) being performed when the shutter 3 is in the opening position.

For example, step a2) lasts between 0.1 seconds and 10 minutes.

An example of an injection or molding cycle comprises the following steps:

when the piston 241 is in the end stroke position distal from the mold, introducing air into the chamber 243, in particular through the channel 255 and the opening 245, until the piston 241 reaches the end stroke position proximal to the mold (FIG. 3A);

when the piston 241 is in the end stroke position proximal to the mold, introducing air into chamber 242, in particular through the channel 254 and first passage 244, thus causing the movement of the piston 241 away from the mold; in this step, during its stroke, the piston 241 keeps the second passage 249 closed (FIGS. 3B and 3C) and then partially closed;

performing the aforesaid step a), FIG. 3D.

Note that in step a) the second passage 249 is free from the piston 241, in particular completely free.

With particular reference to FIGS. 4A, 4B, 4C, 4D, 5A and 5B, in a third embodiment, the second passage 349 of the chamber 342 is made in the guiding body 32 of the shutter 3. Note that in FIGS. 5A and 5B, the shutter 3 has been removed to provide a better illustration of other details.

The guiding body 32 of the shutter 3 is provided with a through hole 35 (FIG. 5A, 5B) crossed by the shutter 3 and communicating with the inside of the chamber 342.

The guiding body 32 comprises at least two discharge channels 33, 34, e.g. four, of which each discharge channel 33, 34 communicates, on the one side, with the environment outside the injection apparatus, and on the other side with said through hole 35 of the guiding body 32. Preferably, the discharge channels 33, 34 are transverse to the longitudinal axis of the shutter 3.

The wall of the guiding body 32 which delimits said through hole 35 is provided with at least one groove 347 or recess which allows the exit of air and of possible plastic particles from the first chamber 342 towards said at least two discharge channels 33, 34. In particular, the groove 347 is obtained in the inner wall of the guiding body 32 which surrounds the shutter 3.

The aforesaid second passage 349 of the chamber 342 comprises said at least one groove 347. Preferably, the second passage 349 comprises or consists of said groove 347, said discharge channels 33, 34 and optionally a part of the annular gap defined between the shutter 3 and the guiding body 32. In particular, said part of the annular gap extends between one end of the guiding body 32 proximal to the piston 341, and said at least two discharge channels 33, 34. In other words, the air and possible plastic particles can pass through the groove 347 and the discharge channels 33, 34 to exit from the chamber 342.

Note that the groove 347 provides a larger passage space, preferably much larger, than the annular gap defined between the shutter 3 and wall portions 358 in which the groove 347 is not made.

Typically, but not exclusively, the difference between the inner diameter at the wall portions 358 not provided with the groove 347 and the outer diameter of the shutter 3 is between 2 and 25 μm.

Instead, the section at the groove 347, i.e. between the groove 347 and the shutter 3, is preferably at least 0.2 mm$^2$, which guarantees the passage of plastic particles, also solid.

Preferably, the groove 347 in particular extends between an end of the guiding body 32 proximal to the piston 341, and said at least two discharge channels 33, 34.

Preferably, the groove 347 extends around the longitudinal axis of the shutter 3.

Figure 5A:
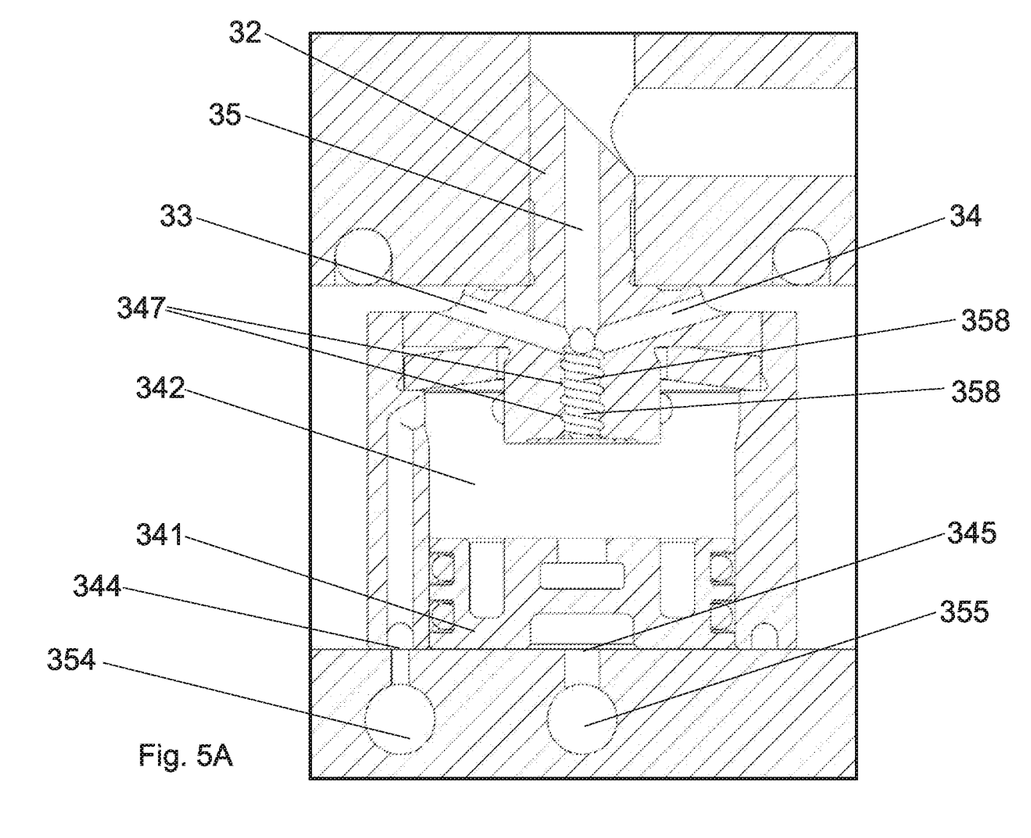
FIG. 5A is a section view of some components of the injection system in FIGS. 4A-4D.
Figure 5B:
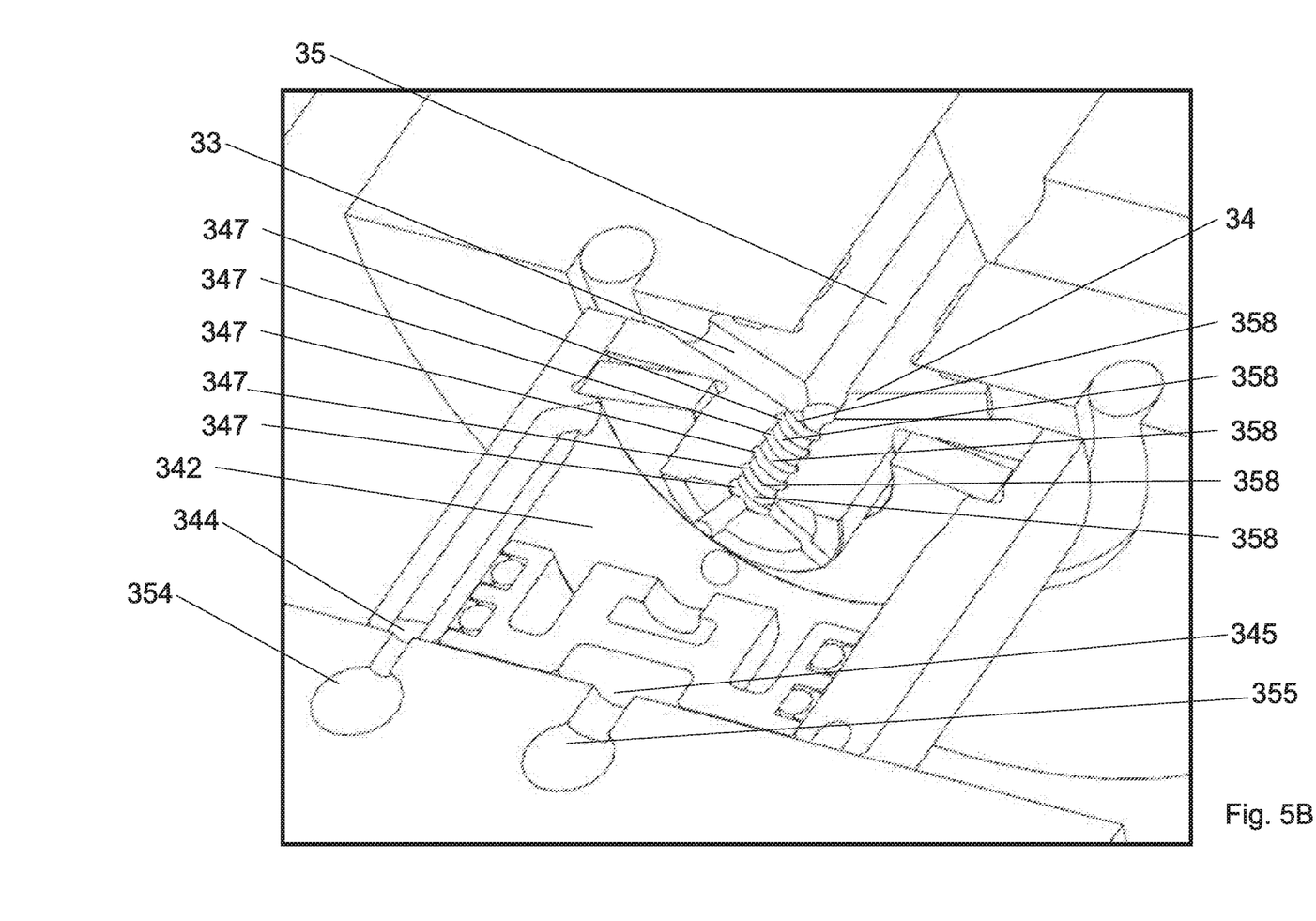
FIG. 5B is a perspective section view of the components shown in FIG. 5A.

Preferably, the groove 347 is helicoidal or spiral-shaped as better seen in FIGS. 5A, 5B.

Alternatively, other groove shapes may also be provided, e.g. grooves parallel or substantially parallel to the longitudinal axis of the shutter 3 can be provided.

Advantageously, in this embodiment, the injection apparatus allows the execution of a method to remove plastic particles, in particular solid particles, from the second chamber 342, comprising a step in which fluid, e.g. air, and possible plastic particles are made to exit from the chamber 342, through the second passage 349, in particular through the groove 347 and the discharge channels 33, 34.

For example, such a step may be performed by introducing fluid into the first passage 344 to take the shutter 3 to the opening position, particularly during the stroke of piston 341 away from the mold and/or by introducing fluid into chamber 343 through the opening 345, in particular during the stroke of piston 341 towards the mold.

Furthermore, the method allows said step to be performed when shutter 3 is in the opening position, i.e. when the piston 341 is in the end stroke position distal from the mold.

An example of an injection or molding cycle comprises the following steps:
  when the piston 341 is in the end stroke position distal from the mold, introducing air into the chamber 343, in particular through the channel 355 and the opening 345, until the piston 341 reaches the end stroke position proximal to the mold (FIG. 4A); note that, advantageously, in this step there is an exit of air and of possible solid plastic particles from the chamber 342 through the passage 349, in particular through the groove 347 and the discharge channels 33, 34.
  when the piston 341 is in the end stroke position proximal to the mold, introducing air into chamber 342, in particular through the channel 354 and the opening 344, thus causing the movement (FIG. 4B, 4C) of the piston 341 away from the mold; note that, advantageously, in this step there is an exit of air and of possible solid plastic particles from the chamber 342 through the passage 349, in particular through the groove 347 and the discharge channels 33, 34.
  when the piston 341 is in the end stroke position distal from the mold (FIG. 4D), in order to have a better cleaning of chamber 342, air can be introduced into the chamber 342 through the first passage 344, and air and plastic particles can exit through the second passage 349 for a predetermined time, e.g. for a time between 0.1 seconds and 10 minutes.

The injection cycle is resumed by introducing air into the chamber 343 in order to take the piston into the position proximal to the mold.

The invention claimed is:

1. An injection apparatus for injecting molten plastic into a mold of articles made of thermoplastic material including bottle preforms, comprising:
  an injection nozzle and a shutter for controlling flow of the molten plastic through the injection nozzle;
  a cylinder-piston system adapted to move said shutter from an open position of the injection nozzle to a closed position of the injection nozzle, and vice versa;
  wherein said cylinder-piston system includes a first chamber provided with a first passage for introduction of fluid into the first chamber to move the shutter to the open position; and a second passage, different from the first passage for the exit of fluid and of possible plastic particles from the first chamber;
  a fluid distribution device provided with a first channel connected to said first passage, and a second channel, different from the first channel and connected to said second passage; and
  wherein the cylinder-piston system further includes a second chamber having a third passage for the introduction of fluid into the second chamber to move the shutter into the closed position, and the fluid distribution device is provided with a third channel connected to said third passage.

2. The injection apparatus according to claim 1, wherein said second passage has a section having an area of at least 0.2 mm$^2$.

3. The injection apparatus according to claim 1, wherein said second passage has a section having an area comprised from 2 mm$^2$ and 5 mm$^2$.

4. The injection apparatus according to claim 1 further comprising a valve adapted to control opening and closing of the first channel and/or of the second channel.

5. The injection apparatus according to claim 4, wherein said valve is adapted to close the first channel and to open the second channel to allow the movement of said shutter from the open position to the closed position.

6. The injection apparatus according to claim 4, wherein said valve is adapted to allow or interrupt a passage of fluid between the first channel and the first passage; and/or is adapted to allow or interrupt a passage of fluid and possible plastic particles between the second passage and the second channel.

7. The injection apparatus according to claim 4, wherein said valve is adapted to allow or interrupt the introduction of fluid from the first channel towards the first passage and/or is adapted to allow or interrupt the exit of fluid and possible plastic particles from the second passage towards the second channel.

8. The injection apparatus according to claim 4, wherein said valve is integrated in the fluid distribution device.

9. The injection apparatus according to claim 4, wherein said valve is an electro-mechanical valve.

10. The injection apparatus according to claim 4, wherein said valve is adapted to open the first channel and to close the second channel to allow the movement of said shutter from the closed position to the open position.

11. The injection apparatus according to claim 1 further comprising a valve adapted to control opening and closing of the first channel and/or of the second channel;
  wherein said valve is adapted to open the third channel to allow the introduction of fluid into the second chamber to thereby cause movement of said shutter from the open position to the closed position when the first channel is closed and the second channel is open.

12. The injection apparatus according to claim 1, wherein said second passage is provided by a side wall of the cylinder of the cylinder-piston system.

13. The injection apparatus according to claim 1, further comprising a guiding body having a through-hole in which the shutter is slidably received, the through-hole communicating with the first chamber;

wherein the guiding body includes at least two discharge channels, of which each discharge channel communicates, on one side, with an environment external from the injection apparatus and, on the other side, with said through-hole of the guiding body.

14. A method for removing plastic particles, in particular solid particles, from the first chamber of an injection apparatus according to claim 1, the method comprising expelling fluid and possible plastic particles from the first chamber through said second passage during movement of the shutter from the open position to the closed position.

15. The method according to claim 14, wherein the first channel is kept closed and the second channel is kept open during movement of the shutter from the open position to the closed position.

16. The method according to claim 14, wherein the cylinder-piston system comprises a second chamber provided with a third passage for the introduction of fluid into the second chamber to move the shutter into the closed position, the method further comprising: introducing fluid into the second chamber through said third passage during movement of the shutter from the open position to the closed position.

17. The injection apparatus according to claim 11, wherein said valve is adapted to close the first channel and to open the second channel to allow movement of said shutter from the open position to the closed position.

* * * * *